(12) United States Patent
Zätterqvist

(10) Patent No.: US 10,871,348 B2
(45) Date of Patent: Dec. 22, 2020

(54) DISPENSER MODULE FOR AIRCRAFT PYLON AND A METHOD FOR LAUNCHING A COUNTERMEASURE

(71) Applicant: SAAB AB, Linköping (SE)

(72) Inventor: Christer Zätterqvist, Uppsala (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 16/618,578

(22) PCT Filed: May 28, 2018

(86) PCT No.: PCT/SE2018/050530
§ 371 (c)(1),
(2) Date: Dec. 2, 2019

(87) PCT Pub. No.: WO2018/222110
PCT Pub. Date: Dec. 6, 2018

(65) Prior Publication Data
US 2020/0158467 A1    May 21, 2020

(30) Foreign Application Priority Data
Jun. 2, 2017 (SE) ..................................... 1750698

(51) Int. Cl.
*F41F 7/00* (2006.01)
*B64D 1/02* (2006.01)
(Continued)

(52) U.S. Cl.
CPC .................. *F41F 7/00* (2013.01); *B64D 1/02* (2013.01); *B64D 7/00* (2013.01); *F42B 5/15* (2013.01); *F42B 12/42* (2013.01)

(58) Field of Classification Search
CPC .... F41F 7/00; B64D 1/02; B64D 7/00; B64D 1/04; B64D 1/08; F42B 5/15; F42B 12/42; F42B 12/70
(Continued)

(56) References Cited

U.S. PATENT DOCUMENTS 2,258,281 A * 10/1941 Dunajeff ................. F42B 12/58
                                                        89/1.59
3,511,457 A *  5/1970 Pogue ...................... B64D 1/02
                                                       244/137.3
(Continued)

FOREIGN PATENT DOCUMENTS

| | | |
|---|---|---|
| EP | 0253028 B1 | 8/1990 |
| EP | 1194331 B1 | 5/2004 |
| FR | 2665875 A1 | 2/1992 |

OTHER PUBLICATIONS

International Search Report and Written Opinion in corresponding International Application No. PCT/SE2018/050530 dated Jul. 4, 2018 (11 pages).

*Primary Examiner* — Joshua E Freeman
(74) *Attorney, Agent, or Firm* — Venable LLP; Jeffri A. Kaminski

(57) ABSTRACT

A dispenser module for storing and launching countermeasures on an aircraft, comprising a magazine formed by a plurality of cartridges adapted to each hold a countermeasure where the dispenser module is adapted to be mounted in a side wall of an aircraft pylon structure, where the dispenser module comprises a spoiler and a hatch, where the magazine is mounted to the hatch, where the dispenser module is adapted to assume a first idle state in which the spoiler and the hatch are retracted to be flush with the side wall before a countermeasure has been launched, and where the dispenser module is adapted to at least assume a second active state in which the spoiler and the hatch extend
(Continued)

outwards from the side wall when a countermeasure is to be launched, and where the dispenser module is adapted to retract to the idle state when a countermeasure has been launched.

18 Claims, 12 Drawing Sheets

(51) Int. Cl.
*B64D 7/00* (2006.01)
*F42B 5/15* (2006.01)
*F42B 12/42* (2006.01)

(58) Field of Classification Search
USPC .......................................................... 102/357
See application file for complete search history.

(56) References Cited

U.S. PATENT DOCUMENTS

| | | | | |
|---|---|---|---|---|
| 3,517,584 A * | 6/1970 | Robinson | ................. | B64D 1/02 89/1.51 |
| 3,547,000 A * | 12/1970 | Haberkorn | ............... | B64D 1/16 89/1.51 |
| 4,781,342 A * | 11/1988 | Hardy | ..................... | B64D 1/04 244/118.1 |
| 5,020,412 A * | 6/1991 | Adams | ..................... | F41F 3/04 89/1.805 |
| 6,098,925 A * | 8/2000 | Burdsall, II | ............ | B64C 23/06 244/118.1 |
| 6,619,178 B1 * | 9/2003 | Fransson | .................. | B64D 1/02 244/137.1 |
| 8,490,924 B2 * | 7/2013 | Zachrisson | ............... | B64D 7/00 244/137.1 |
| 8,549,976 B2 * | 10/2013 | Zatterqvist | ............... | F41F 3/065 89/1.51 |
| 8,720,829 B2 * | 5/2014 | Zatterqvist | ............... | B64D 7/00 244/137.1 |
| 10,486,813 B2 * | 11/2019 | Zaetterqvist | ............ | B64D 1/02 |
| 10,683,090 B2 * | 6/2020 | Zaetterqvist | ............ | F41A 27/08 |
| 10,696,401 B2 * | 6/2020 | Zaetterqvist | ............ | F41A 21/32 |
| 2005/0204910 A1 | 9/2005 | Padan | .................... | B64D 37/12 89/1.813 |
| 2009/0314893 A1 * | 12/2009 | Lugaro | .................... | B64D 1/06 244/129.5 |
| 2011/0056367 A1 * | 3/2011 | Cazalieres | ............... | F41A 23/20 89/36.13 |
| 2011/0155856 A1 * | 6/2011 | Zachrisson | ............... | F42B 5/15 244/136 |
| 2012/0104174 A1 * | 5/2012 | Zatterqvist | ............... | F42B 12/70 244/137.1 |
| 2012/0125183 A1 * | 5/2012 | Zatterqvist | ............... | B64D 7/00 89/1.51 |
| 2013/0167711 A1 * | 7/2013 | Zatterqvist | ............... | B64D 7/00 89/1.56 |
| 2016/0121996 A1 * | 5/2016 | Eveker | .................... | B64C 23/06 244/130 |
| 2018/0086463 A1 * | 3/2018 | Chattopadhyay | ........ | B64D 7/06 |

* cited by examiner

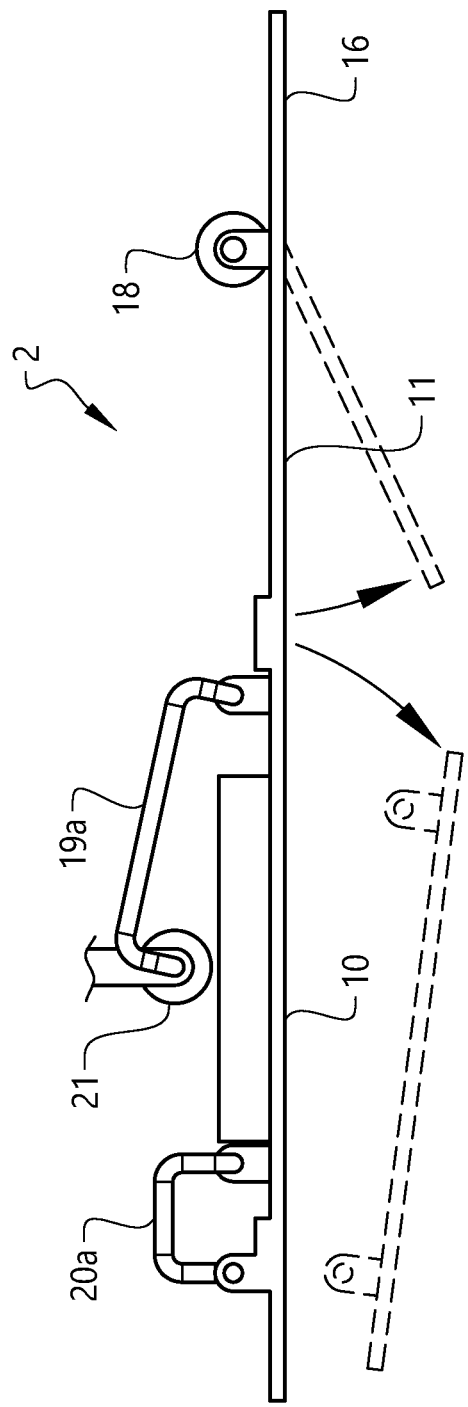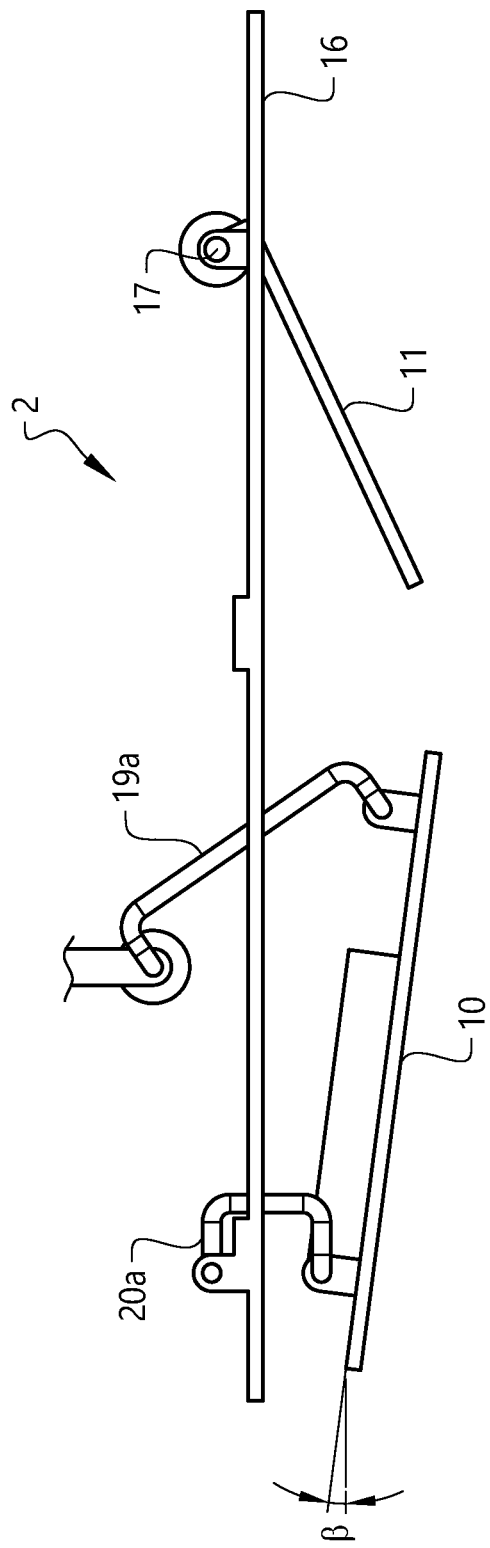

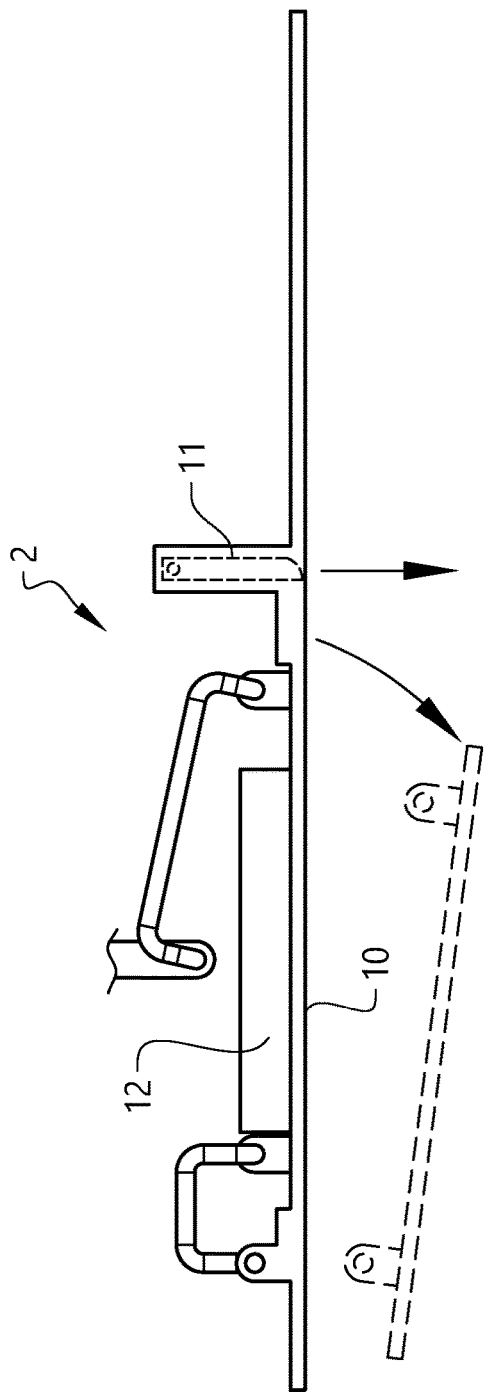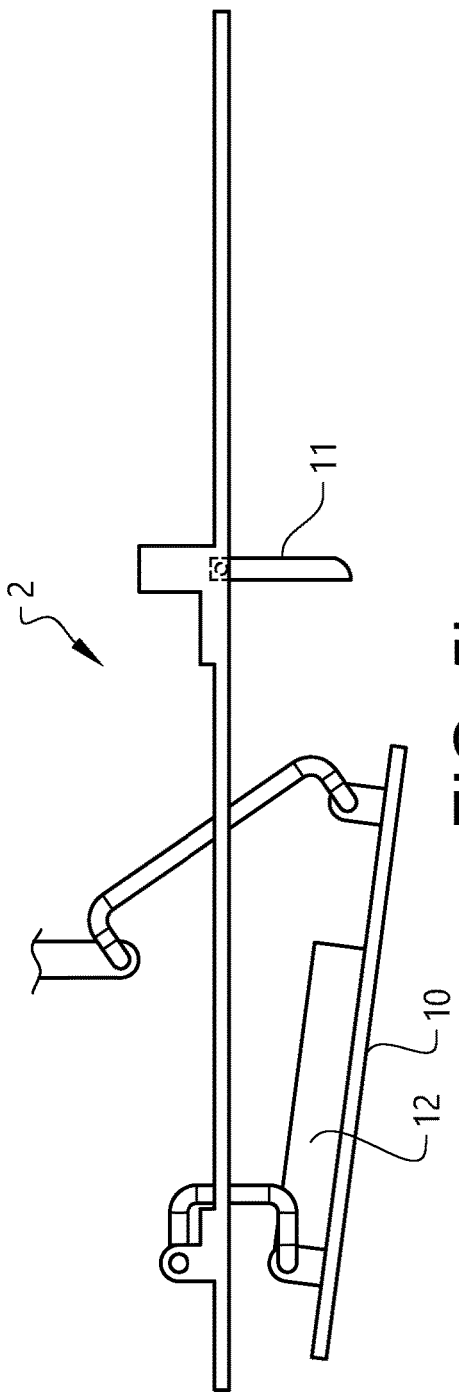

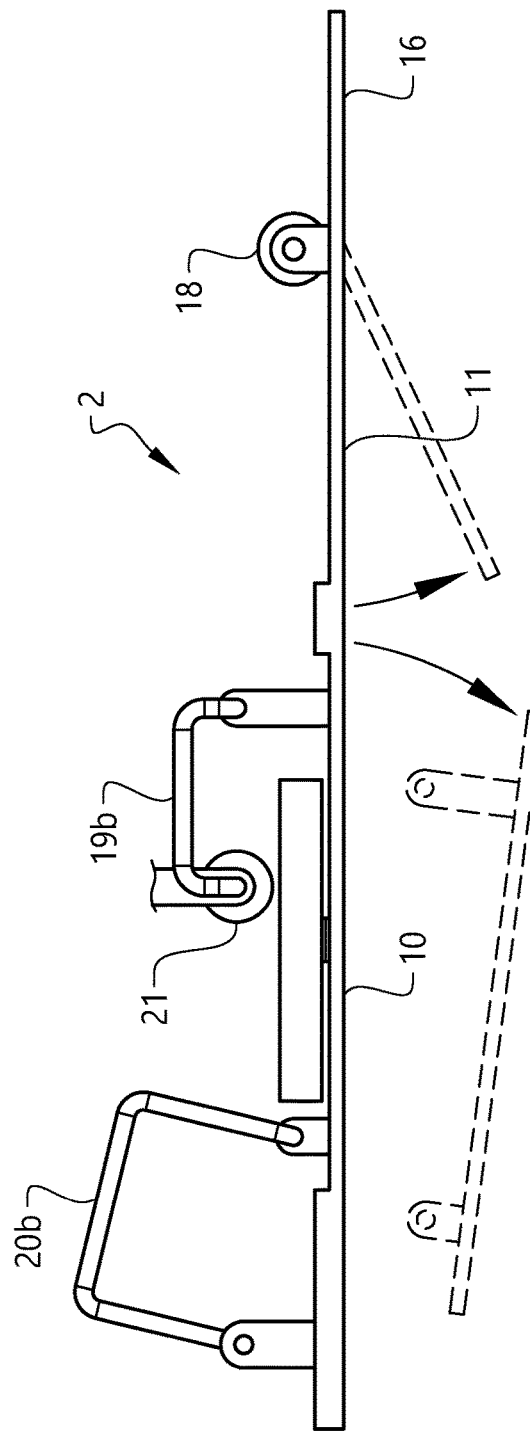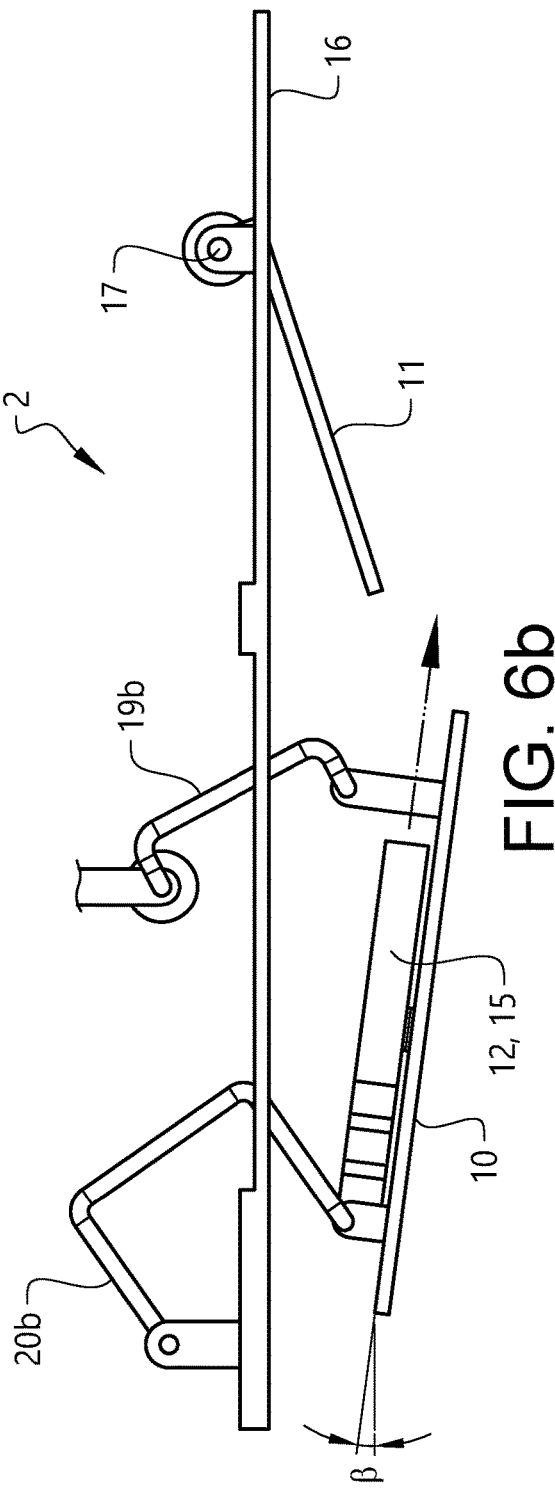

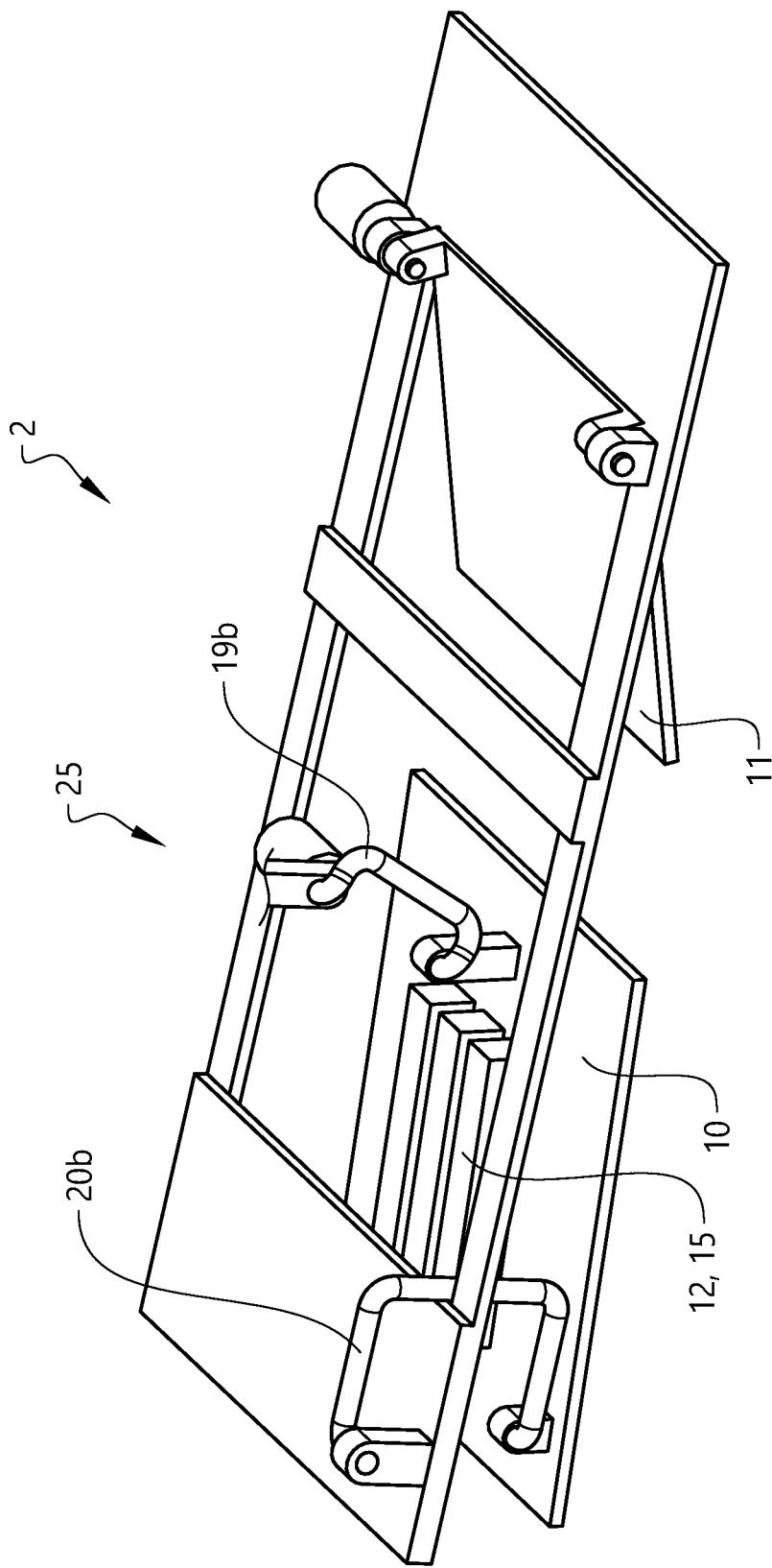

US 10,871,348 B2

DISPENSER MODULE FOR AIRCRAFT PYLON AND A METHOD FOR LAUNCHING A COUNTERMEASURE

CROSS-REFERENCE TO RELATED APPLICATIONS

This application is a U.S. National Stage application of PCT/SE2018/050530, filed May 28, 2018 and published on Dec. 6, 2018 as WO2018/222110, which claims the benefit of Swedish Patent Application No. 1750698-1, filed Jun. 2, 2017, all of which are hereby incorporated by reference in their entireties.

TECHNICAL FIELD

The present invention relates to a dispenser module adapted to be integrated in an aircraft pylon for storing and launching countermeasures, such as flares and chaff. The dispenser module may comprises a variable magazine.

BACKGROUND ART

Arrangements for storing and launching payloads, such as countermeasures, which are designed to be mounted on aircrafts, are previously known. Such arrangements comprise an elongate body provided with at least one launch opening. The shape of the arrangement may have other equivalent shapes, such as an elliptic or circular shape. However, an elongate body is an efficient shape. Such arrangements are mounted with the longitudinal direction of the elongate body essentially coinciding with the flight direction of the aircraft. The countermeasures are connected to a firing control unit for feeding firing signals to the countermeasures. The countermeasures can consist of passive means, such as chaff foil, but can also consist of e.g. IR flares, or other active measures. The countermeasures are stored in a magazine in the arrangement, comprising a plurality of cartridges, with one or more smaller countermeasures in each cartridge. A countermeasure may be launched in a rearward or downward direction from the aircraft, which is mostly suitable for passive countermeasures. It is also possible to launch a countermeasure in a forward direction of the aircraft.

One problem with known arrangements is that unfavourable acoustic phenomenon, such as extremely high air induced noise and vibration levels, are generated due to the open cavities of the cartridges holding the countermeasures, after firing of the countermeasures. The relative wind speed, due to the speed of the aircraft, interacts with the opening of an empty cartridge in which a countermeasure has been stored. The open cavity may act as barrels which oscillate at its natural inherent frequency. This acoustic noise can be localised by human ear and may also cause damage on the equipment, such as electric components, due to the strong vibrations created. The longitudinal extension and the number of openings of the cartridges in the elongated body can be rather large. The angle of a cartridge relative the travelling direction of the aircraft will also affect the induction of acoustic noise.

It is known to arrange a vortex generating means in front of a launch opening, which is adapted to disturb and distribute the wind flow over the magazine in order to reduce the induced noise by creating a turbulent air flow. However, the effect of such a vortex generating means decreases with the increasing length of the launch opening, since the air flow will be more laminar farther away from the vortex generating means, i.e. the air flow may be relatively laminar at the rear of a longer opening.

Further, such a vortex generating means will generate turbulent flows that are difficult to control and that will result in high energy losses. Such a solution may also contribute to an increased extension of the design of the arrangement in the longitudinal extension of the elongated body.

A further problem with such an arrangement is that the arrangement is sensitive for influence of the air flow depending e.g. on the speed of the aircraft and of the position of the elongated body. This solution will further not reduce the Radar Cross Section (RCS) created by the open cavities.

A further disadvantage with known dispensers is that the dispenser uses a weapon station on the aircraft, which reduces the amount of weapons that the aircraft can carry.

An example of a previously known arrangement described as a dispenser which is used for launching countermeasures and which is provided with several cartridges, is described in document EP 1194331 B1. An elongated body of the dispenser is provided with fixed means, described as a spoiler, in front of each compartment for acting on the air stream and for creating a low dynamic pressure across the compartment openings.

From document EP 0253028 B1, it is known to provide the exterior surface of an aircraft with a pair of vortex generators arranged right in front of an inlet opening in order to increase the mass airflow into the inlet.

A further disadvantage with known dispensers is that the launch angle is fixed to a set angle which is believed to be optimal for the intended use.

The known solutions will reduce the acoustic noise induced by an open cavity. They will however cause a high energy loss. Even though these arrangements may give an acceptable result in some cases, there is room for improvements.

DISCLOSURE OF INVENTION

One object of the present invention is to at least partially eliminate the drawbacks associated with the solutions known in the prior art. Another object is to minimise the occurrence of acoustic phenomenon which are caused by the openings in cavities which have been emptied of payloads, such as countermeasures. Another object is to minimize aerodynamic drag and radar cross section. Another object is to provide a dispenser module in which the launch angle can be varied. Another object of the invention is to provide an aircraft comprising such a dispenser module.

The solution to the problem according to the invention is described in the characterizing part of claim 1. Claim 15 refers to an advantageous method for launching a countermeasure. The other claims contain advantageous embodiments and further developments of the dispenser module and the method.

In a dispenser module for storing and launching countermeasures on an aircraft, comprising a magazine formed by a plurality of cartridges adapted to each hold a countermeasure, the object of the invention is achieved in that the dispenser module is adapted to be mounted in a side wall of an aircraft fuselage or an aircraft pylon structure, where the dispenser module comprises a spoiler, wherein the spoiler is positioned at the front part of the dispenser module, and a hatch, wherein the hatch is positioned at the rear part of the dispenser module, where the magazine is mounted to the hatch, where the dispenser module is adapted to assume a first idle state in which the spoiler and the hatch are retracted to be flush with the side wall before a countermeasure has been launched, where the dispenser module is adapted to assume at least a second active state in which the spoiler and the hatch extend outwards from the side wall when a countermeasure is to be launched, and where the dispenser module is adapted to retract to the idle state when a countermeasure has been launched.

By this first embodiment of the dispenser module according to the invention, a dispenser module adapted to be integrated in an aircraft pylon structure is provided, in which the cartridges of the countermeasure magazine are concealed when not in use. This will reduce the energy losses caused by a protruding magazine and/or a protruding spoiler. A further advantage is that cartridges directed in a forward direction can be used without inducing unfavourable acoustic phenomenon, such as extremely high air induced noise and vibration levels. By retracting the magazine when a countermeasure has been launched, the problem with induced noise is minimized. By using an extending spoiler in front of the magazine, the problem with induced noise is further reduced. A further advantage by using an extended spoiler is that the energy needed to extend and/or retract the hatch will be minimized.

A further advantage of a dispenser module integrated in an aircraft pylon structure is that it is not necessary to mount a dispenser on a weapon station of the aircraft, which allows the aircraft to carry additional objects mounted at the weapon station, e.g. additional weapons or surveillance equipment.

In a development of the dispenser module, the cartridges of the magazine may be pivoted from a first position to a second position. In this way, it is possible to adjust the launch angle of a countermeasure. A further advantage of using a pivotable magazine is that more cartridges can be fitted in a magazine, which allows for an efficient use of the available space in an aircraft pylon. In the first position, the cartridges are aligned with a side of the hatch, such that the long side of a cartridge is parallel with a horizontal or vertical side of the hatch when mounted on an aircraft. When the hatch is opened, the cartridges are pivoted outwards using the hatch pivot geometry and downwards to a desired launch angle, and such that the launch angle does not interfere with the spoiler or installed weapons.

The cartridges are arranged adjacent each other in a slidably manner, such that the cartridges allows for pivoting of the magazine. In this way, the openings of the cartridges can be directed in a selected direction. The cartridges are attached to the hatch at the rear of each cartridge and are attached to an actuator at a front section of the cartridge. In this way, the cartridges can be pivoted to a desired angle. Since the distance between two adjacent cartridges will vary with the tilt angle, the cartridges are interconnected to each other in a flexible way which may comprise resilient means.

In another development of the dispenser module, the magazine comprises a number of cartridges fixedly arranged in parallel to each other. In this development the magazine is arranged to the hatch such that the magazine may be pivoted from a first position to a second position, whereby the launch angle of a countermeasure can be adjusted. The magazine is also attached to an actuator enabling that the magazine may be pivoted to a desired angle. The actuator may e.g. be arranged where the magazine is attached to the hatch. Except for that the cartridges of the magazine are fixedly arranged in parallel to each other this development of the invention works in the same way as developments of the invention with magazines comprising cartridges arranged adjacent each other in a slidably manner.

The hatch of the dispenser module will open before a countermeasure is to be launched. The front of the hatch will extend further than the rear of the hatch when the dispenser module is in the second active state, such that a countermeasure will be directed away from the aircraft pylon and from an object attached to the pylon at the weapon station, such as a loaded weapon. The front of the hatch will preferably be angled outwards by an angle of 5-15 degrees relative the rear of the hatch.

As will be discussed below, developments of the dispenser module may also be capable of assuming a third active state in which the rear of the hatch will extend further from the aircraft fuselage than the front of the hatch, whereby the magazine may be pivoted to a third position.

The spoiler of the dispenser module will also open before a countermeasure is to be launched. In one example, the spoiler opens at the same time as the hatch. The hatch and the spoiler may in this case be operated by the same actuator, and may be connected to each other by a mechanical linkage. In this way, the hatch and the spoiler will also close at the same time. In one development of the invention the rear part of the spoiler, i.e. the part of the spoiler provided closest to the hatch, is mechanically connected to the front part of the hatch, i.e. to the part of the hatch provided closest to the spoiler.

It is also possible to let the hatch open before or after the hatch is opened. By extending the hatch outwards from the wall of the aircraft pylon structure before the spoiler is opened, the air flow will help to open the hatch and will also help to keep the hatch in an open position. This will further allow the hatch to be opened very fast. It is of advantage to open the hatch in a fast manner, e.g. in 50-200 ms. The spoiler may open in conjunction with the hatch or at a slower opening rate.

The spoiler may be a door hingedly suspended at one side of the spoiler, at the side directed in a forward direction of the aircraft. The spoiler is in this case swung open by an actuator such that the spoiler can direct the air flow over the opening of the hatch or that the spoiler can create a turbulent airflow over the hatch opening. This will reduce the induction of noise in open cartridges.

The spoiler may also extend outwards from the aircraft pylon side wall in a perpendicular direction. In this case, the spoiler will create a turbulent air flow in front of the hatch opening which will reduce the induced noise of open cartridges. An advantage of using a spoiler that extends perpendicularly to the dispenser module is that the energy needed to extend and/or retract the spoiler is minimized.

A cartridge is advantageously provided with a square cross-section, but may also be provided with other cross-sectional shapes, e.g. a triangular, oval, round or polygonal shape. Depending on the cross-sectional shape, the interconnection means are adapted to the shape of the cartridge.

The magazine of the dispenser module is arranged to be pivoted by an actuator in a selected angle with reference to the direction of motion of the aircraft, such that the openings of the cartridges can be directed in the selected direction. The magazine and thus the cartridges are adapted to be pivoted from a first resting position to a second active position. Here, the directions will be defined as follows. The forward direction of the aircraft is defined as the direction of motion of the aircraft. An aircraft is normally flying in the horizontal plane, i.e. the wings of the plane are parallel to the horizontal plane. The horizontal plane comprises a forward horizontal direction, i.e. the direction of motion of the aircraft, and a sideway horizontal direction, i.e. perpendicular to the forward horizontal direction. The vertical direction is defined as being perpendicular to the horizontal plane.

In one development of the dispenser module, in which the magazine comprises a number of cartridges fixedly arranged in parallel to each other, the magazine is arranged to the hatch such that the magazine may be pivoted from a first position, to a second position and to a third position, whereby the launch angle of a countermeasure can be adjusted to cover an larger launching angle range. The magazine is attached to an actuator enabling that the magazine may be pivoted to a desired angle. The actuator may e.g. be arranged where the magazine is attached to the hatch.

Thus, in developments of the dispenser module, the magazine comprising the cartridges may be pivoted from the first position, via the second position to a third position. The magazine being pivoted to the second position coincides with the dispenser module being in the second active state and the magazine being pivoted to the third position coincides with the dispenser module being in a third active state. The third position differs from the first position by at least 100 degrees, i.e. differs from the second position by at least 60 degrees. In this way, it is possible to further adjust the launch angle of a countermeasure. Thereby, when the dispenser module is in the third position a launched countermeasure is launched backwards, i.e. aft, and possibly also downwards.

The direction in which it is desirable to be able to launch countermeasures is e.g. dependent on where hostile forces are located and/or from what direction missiles, rockets etc. are launched against the aircraft. Thus, in certain situations it may be advantageous to be able to launch countermeasures in a forward, downward and/or backward direction. According to a further development the rear of the hatch will extend further than the front of the hatch when the dispenser module is in the third active state, such that if the magazine is in the third position a countermeasure will be directed away from the aircraft pylon structure or aircraft fuselage. The rear of the hatch will preferably be angled outwards by an angle of 5-20 degrees relative the aircraft fuselage, i.e. aircraft pylon structure.

In comparison to previously disclosed developments of the invention in which the dispenser module only is capable of assuming a first idle state and a second active state, the capability to also assume a third active state is enabled by that a rear, second linkage is longer and the position where the rear, second linkage is arranged to be inside of the side wall of the aircraft is provided further back in relation to the spoiler. Thereby the rear part of the hatch may extend from the side wall of the fuselage. This in turn has the effect that when the cartridges/magazine of the dispenser module is pivoted to the third position the openings of the cartridges are directed away from the aircraft fuselage, thereby preventing the countermeasures from hitting the aircraft or any object or structure mounted thereto when being launched. This is disclosed more in detail below.

The invention also relates to a method for launching a countermeasure from a dispenser module mounted in an aircraft pylon. The countermeasure is arranged in a cartridge comprised in a magazine. The method comprises the steps of: opening the hatch and the spoiler of the dispenser module, launching the countermeasure, and closing the hatch and the spoiler of the dispenser module. The method may also include the step of pivoting the cartridges before launching the countermeasure.

BRIEF DESCRIPTION OF DRAWINGS

The invention will be described in greater detail in the following, with reference to the embodiments that are shown in the attached drawings, in which FIG. 1 schematically shows a side view of an aircraft provided with a dispenser module according to the invention for storing and launching countermeasures, FIG. 2a schematically shows a top view of an embodiment of a dispenser module in a first idle state according to the invention, FIG. 2b schematically shows a top view of an embodiment of a dispenser module in a second active state according to the invention, FIG. 3a schematically shows a 3D view of an embodiment of a dispenser module in a first idle state according to the invention, FIG. 3b schematically shows a 3D view of an embodiment of a dispenser module in a second active state according to the invention, FIG. 4 schematically shows an embodiment of a dispenser module mounted in an aircraft pylon according to the invention in a second active state, FIG. 5a schematically shows a top view of an alternative embodiment of a dispenser module in a first idle state according to the invention, FIG. 5b schematically shows a top view of an alternative embodiment of a dispenser module in a second active state according to the invention, FIG. 6a schematically shows a top view of another alternative embodiment of a dispenser module in a first idle state according to the invention, FIG. 6b schematically shows a top view of another alternative embodiment of a dispenser module in a second active state, and in which the cartridges are pivoted to a second position, according to the invention, FIG. 6c schematically shows a top view of another alternative embodiment of a dispenser module in a third active state, and in which the cartridges are pivoted to a third position, according to the invention, FIG. 7a schematically shows a 3D view of an embodiment of a dispenser module in a first idle state according to the invention, FIG. 7b schematically shows a 3D view of an embodiment of a dispenser module in a second active state, and in which the cartridges are pivoted to a second position, according to the invention, FIG. 7c schematically shows a 3D view of an embodiment of a dispenser module in a third active state, and in which the cartridges are pivoted to a third position, according to the invention, and FIG. 8 schematically shows a 3D view of an alternative embodiment of a dispenser module in a first idle state according to the invention.

MODES FOR CARRYING OUT THE INVENTION

The embodiments of the invention with further developments described in the following are to be regarded only as examples and are in no way to limit the scope of the protection provided by the patent claims. References such as longitudinal, horizontal, vertical, forward, rearward, sideway, etc. refer to directions of an aircraft flying forwards in a normal orientation.

Figure 1:
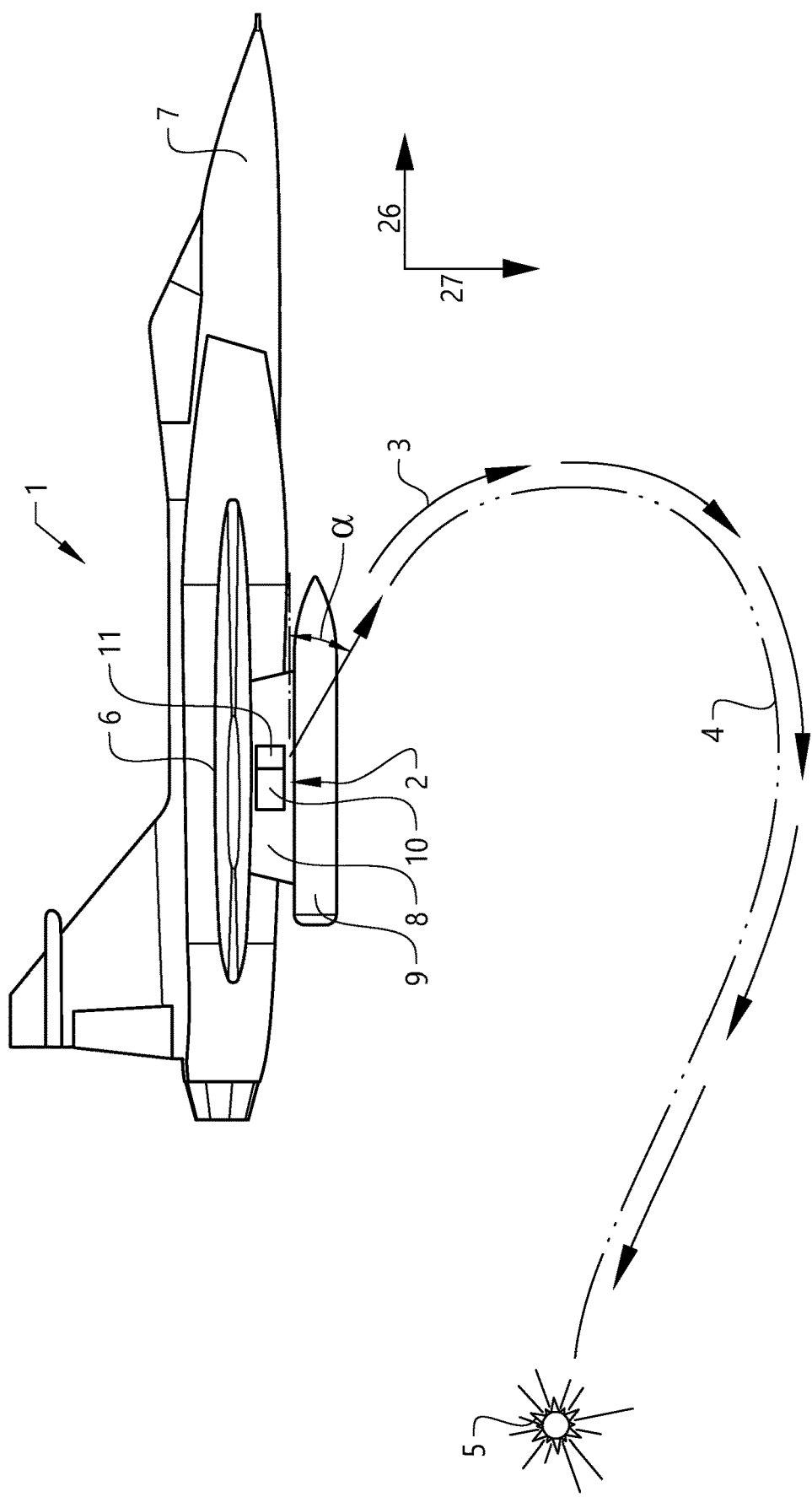

An aircraft 1 shown in FIG. 1 is provided with a dispenser module 2 for storing and launching payloads, hereinafter described as countermeasures 5. The dispenser module 2 may be mounted to an aircraft fuselage or an aircraft pylon structure 8. In the shown example, the dispenser module 2 is integrated in the aircraft pylon structure 8 which is attached under a wing 6 of the aircraft 1. A weapon 9 is attached to the aircraft pylon structure 8. The dispenser module 2 has its longitudinal direction essentially coinciding with the longitudinal direction of the aircraft 1. An arrow 3 designates the direction of launching from the dispenser module 2. The angle α designates the launch angle relative to the direction of movement of the aircraft 1 when a countermeasure 5 is launched obliquely forwards and downwards. The trajectory 4 for a launched flare 5 is indicated by a broken line. A conventional countermeasure 5, such as a flare, will separate from the aircraft 1 approximately as shown in FIG. 1, whereas a kinematic flare (not shown) will separate from the aircraft 1 in a trajectory predominantly coinciding with an angle α.

Here, the directions are defined as follows. The forward horizontal direction 26 of the aircraft is defined as the direction of motion of the aircraft 1. The plane is flying in the horizontal plane, i.e. the wings of the plane are parallel to the horizontal plane. The horizontal plane comprises a forward horizontal direction, i.e. the direction of motion of the aircraft 1, and a sideway horizontal direction, i.e. perpendicular to the forward horizontal direction. The vertical direction 27 is defined as being perpendicular to the horizontal plane.

One or more dispenser modules 2 may be mounted in an aircraft pylon structure 8. It is possible to place one dispenser module in each side of the aircraft pylon structure 8, or it would be possible to place two or more dispenser modules in one or both sides of an aircraft pylon structure 8. The dispenser module 2 comprises a hatch 10 and a spoiler 11. The spoiler 11 is positioned at the front part of the dispenser module 2 and the hatch 10 at the rear part of the dispenser module 2. It could also be possible to integrate a dispenser module 2 in the body of the aircraft 1.

Figure 3A:
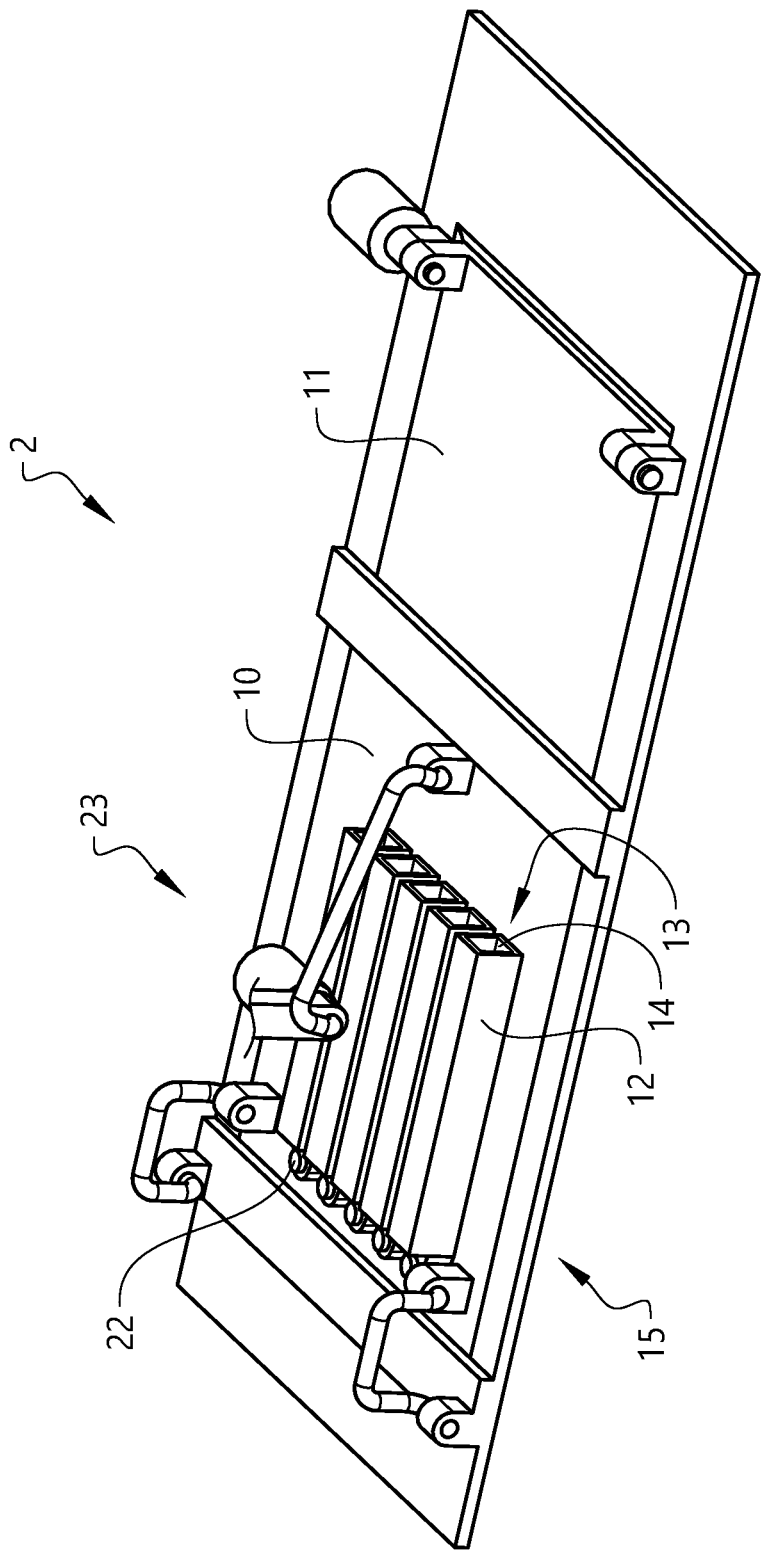
Figure 3B:
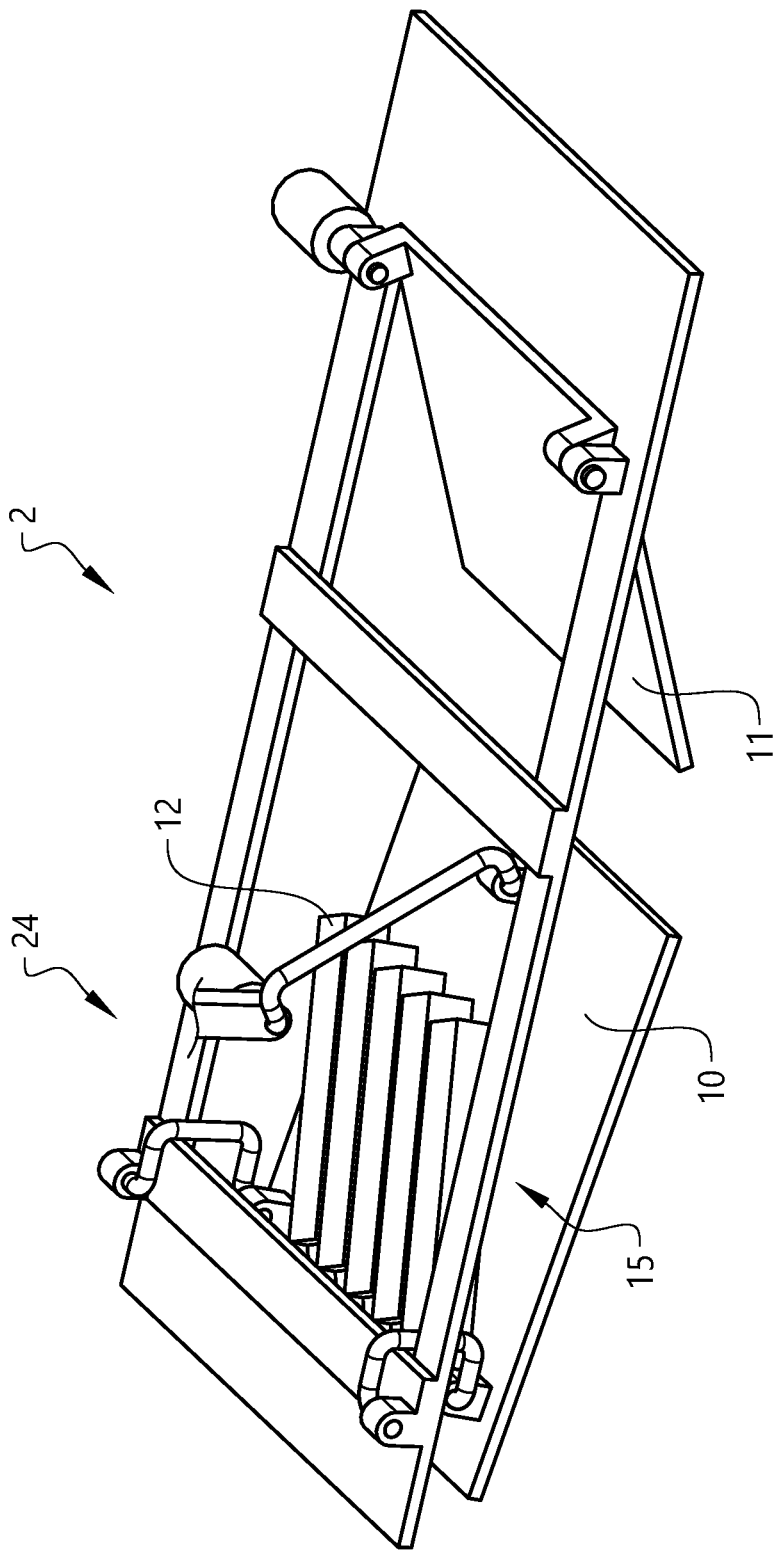
Figure 4:
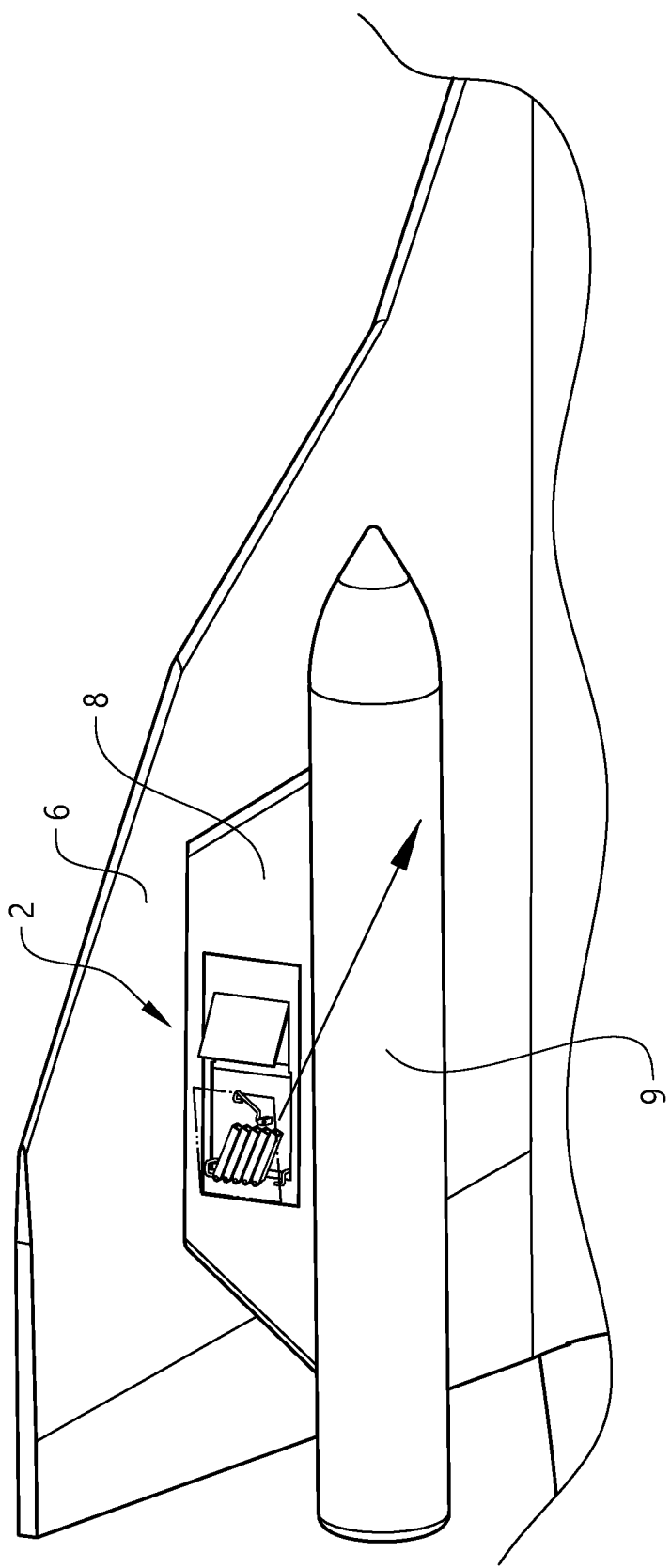

The dispenser module 2 is arranged to extend in the longitudinal direction of the aircraft 1, thus the spoiler 11 and the hatch 10 of the dispenser module 2 are opened in the longitudinal direction of the aircraft 1. Embodiments of dispenser modules 2 are described in more detail with reference to FIGS. 2 to 8. FIG. 2a schematically shows a top view of an embodiment of a dispenser module 2 in a first idle state, FIG. 2b shows a top view of an embodiment of a dispenser module 2 in a second active state, FIG. 3a schematically shows a 3D view of an embodiment of a dispenser module 2 in a first idle state, and FIG. 3b shows a rear view of an embodiment of a dispenser module 2 in a second active state. FIG. 4 shows an embodiment of a dispenser module 2 mounted in an aircraft pylon structure 8 in a second active state. FIG. 5a and FIG. 5b show a top view of an alternative embodiment of a dispenser module 2 with an alternative spoiler arrangement.

FIGS. 6a to 6c, 7a to 7c and 8 show similar views of alternative embodiments of dispenser modules 2 according to the invention.

The described dispenser module is adapted to be used on an aircraft and the angles described here are thus adapted for the use on an aircraft. Other angles are of course also possible. The dispenser module 2 is adapted to be mounted in a pylon structure 8 of an aircraft 1 and may be either a self-contained module that can be removed from the pylon structure 8, or may be integrated with the structure of the aircraft pylon structure 8.

The dispenser module 2 is provided with a hatch 10 and a spoiler 11. In a first state, shown in FIG. 2a, the dispenser module 2 is in an idle state and the hatch 10 and the spoiler 11 are flush with the side wall 16 of the aircraft pylon structure 8. In this state, the dispenser module 2 will not introduce any air drag and will not cause any energy losses when the aircraft 1 travels at high speed. In the shown example, the spoiler 11 is a door that is hingedly suspended at a hinge 17 at the front side of the spoiler 11. The spoiler 11 is operated by a first actuator 18, which may e.g. be a motor or a solenoid. The hatch 10 is suspended to the dispenser module 2 by a first linkage 19a and a second linkage 20a. The first linkage 19a is arranged at the front of the hatch 10 and comprises in the shown example one link arm. The first linkage 19a is operated by a second actuator 21, which may also e.g. be a motor or a solenoid. It is also possible to operate the spoiler and the hatch with the same actuator, and to connect the spoiler and the hatch with a linkage such that they are operated at the same time. The second linkage 20a is arranged at the rear of the hatch, and comprises in the shown example two link arms. The hatch 10 swings open by operating the actuator. The hatch 10 will open to an active second position where the hatch 10 is positioned with an angle relative the pylon wall, such that the front part of the hatch is opened more than the rear part of the hatch, as is shown in FIG. 2b. The angle β is preferably in the range between 5 to 15 degrees. One reason for opening the front part more than the rear part is to let the hatch 10 be directed slightly outwards from the side wall 16, such that the launch angle of a countermeasure will be clear from the aircraft pylon structure 8 and from any object mounted to the weapon station of the aircraft pylon structure 8.

The spoiler 11 may open simultaneously with the hatch 10. In this way, the air flow over the hatch opening will be reduced during the complete opening stage of the dispenser module 2. This will reduce induced aeroacoustics noise, especially if some of the cartridges are empty. It is also possible to let the spoiler 11 open slightly slower than the hatch 10. This will allow the hatch 10 to open by the help of the air flow, which will help to force the hatch 10 open.

When the hatch 10 is opened, the spoiler 11 opens and reduces the air flow over the hatch opening.

The dispenser module 2 comprises a plurality of cartridges 12, arranged adjacent each other to form a magazine 15. A cartridge 12 comprises a cavity 13, adapted to store the countermeasure 5 and is provided with an opening 14. The countermeasures 5 are connected to a launching control unit (not shown) for feeding launching signals to the countermeasures. The cartridges 12 are mounted on the inside of the hatch, and are in the shown example attached to the hatch 10 in a pivotable manner by a pivot point 22 arranged at the rear end of each cartridge. An actuator (not shown) is arranged to pivot the cartridges of the magazine when the hatch has opened from a first position to a second position. In the first position, the cartridges are arranged parallel to one side of the hatch. In the example shown in FIG. 3a, the cartridges are parallel with the longitudinal side of the hatch such that the cartridges are horizontal when the aircraft travels forwards in a normal orientation. The cartridges may also be arranged in a vertical direction in the first position. In the second position, the cartridges 12 are arranged in a desired launch angle as shown in FIG. 3b. The cartridges are pivoted to the second position after the hatch has opened.

In the shown example, the magazine 15 comprises five cartridges 12. The number of cartridges used depend on the size of the dispenser module and if the cartridges are pivotable or not. The cartridges are arranged in one layer in the shown example, but it would be possible to use two layers of square cartridges. If circular cartridges are used, they may be arranged with an offset between the first and the second layer. The second position of the cartridges may be a predetermined angular position, or the second position may be variable such that the launch angle can be varied within a predefined range. It is important to secure that the launch angle will never interfere with the spoiler or an object attached to the aircraft pylon. It is also possible to use fixed cartridges that are directed in a desired launch angle, even if this will reduce the number of cartridges that can be used. In such embodiments the magazine is pivotably attached to the hatch.

It is of advantage to open the hatch in a quick manner, with a desirable opening time of less than a second, and preferably in the region of 50-200 ms. For this reason, the hatch and possibly the spoiler may be spring-loaded such that they are forced open by the spring force. The closing of the hatch and the spoiler may take several seconds or more.

In the example shown in FIG. 3a, the magazine 15 is in a resting position, herein referred to as first position, where the cartridges 12 are directed in the forward direction, and arranged horizontally. In FIG. 3b, the magazine 15 is in an active position, herein referred to as second position, with the cartridges directed downwards by the launch angle α which in the shown example is 30 degrees relative the forward horizontal direction 26. This angle is preferably in the range between 20-45 degrees, but depends on e.g. the design of the dispenser module, the aircraft pylon structure and the object attached to the weapon station of the pylon. In this way, a forward launch angle is obtained. In the second active position, the cartridges are also directed in a sideway direction of e.g. 15 degrees. An example of a dispenser module mounted in an aircraft pylon in an active state is shown in FIG. 4. A further example of a dispenser module having an alternative spoiler is shown in FIG. 5a, where the dispenser module is in a first idle state and the hatch and the spoiler are flush with the wall 16 of the aircraft pylon structure.

In the shown example, the spoiler 11 is arranged perpendicularly to the dispenser module 2. In the first idle state, the spoiler 11 is fully retracted. In the second active state, the spoiler 11 will extend perpendicularly in an outward direction from the dispenser module 2, as shown in FIG. 5b. The spoiler 11 is operated by an actuator, which may e.g. be a motor or a solenoid. The hatch 10 is operated in the same way as described above. The spoiler 11 and the hatch 10 may be operated with the same actuator at the same time. The spoiler 11 may be a rigid part, or may be provided with a plurality of openings that will decrease the force acting on the spoiler 11, but that will create a turbulent airflow over the hatch opening.

As previously mentioned, according to the invention a magazine may comprise a number of cartridges fixedly arranged in parallel to each other. Such magazine is arranged to the hatch such that the magazine may be pivoted whereby the launch angle of a countermeasure can be adjusted. Exemplary embodiments of such a magazine is disclosed in FIGS. 6a to 6c, 7a to 7c and 8.

FIG. 6a schematically shows a top view of another alternative embodiment of a dispenser module 2. The dispenser module 2 is provided with a hatch 10 and a spoiler 11. The hatch 10 is suspended to the dispenser module 2 by a first linkage 19b and a second linkage 20b. In FIG. 6a the dispenser module 2 is in a first idle state in which the spoiler 11 and the hatch 10 are retracted to be flush with the side wall 16 of the aircraft and a magazine 15 comprising a plurality of cartridges 12 are in a first position. In this state, the dispenser module 2 will not introduce any air drag and will not cause any energy losses when the aircraft travels at high speed.

Figure 6C:
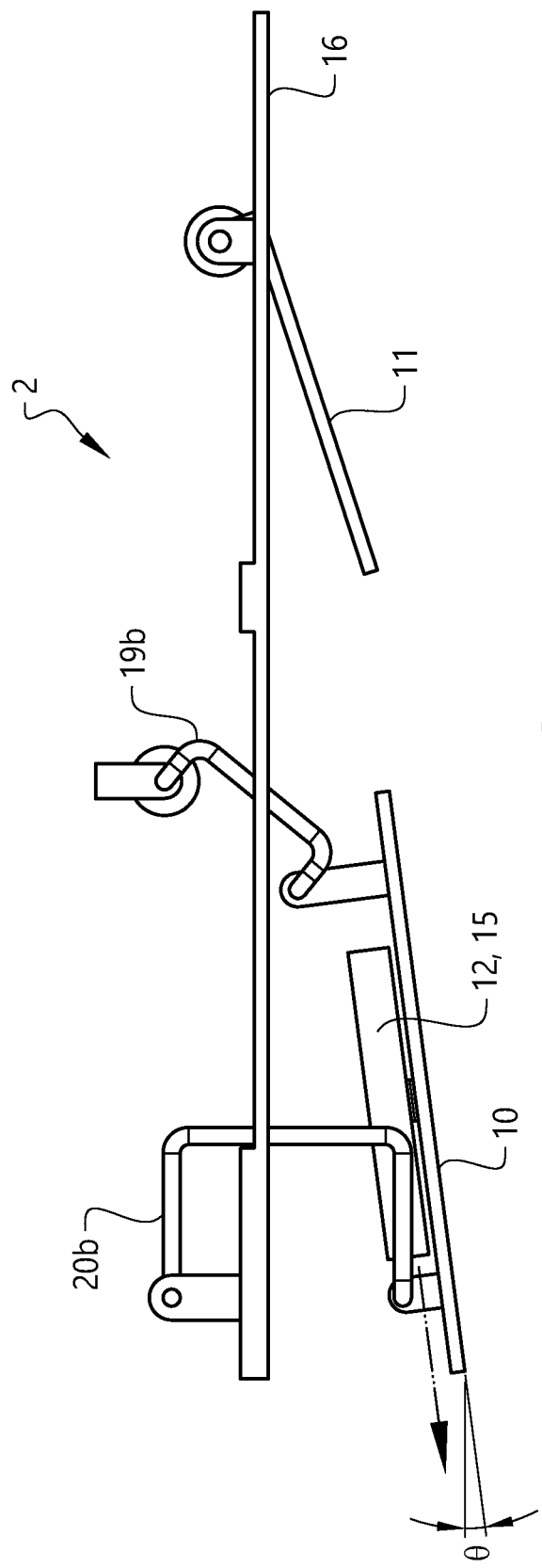

In FIG. 6b the dispenser module 2 is in second active state, wherein the magazine 15 is in a second position, and in FIG. 6c the dispenser module is in a third active state, wherein the magazine 15 is in a third position. The second position of the magazine or cartridges may be a predetermined angular position, or the second position may be variable such that the launch angle can be varied within a predefined range. In the second position, also referred to as a forward firing position, the hatch 10, of the embodiment of a dispenser module 2 of FIGS. 6a to 6c, is essentially half open, and in the third position, also referred to as an aft firing position, the hatch 10 is fully open. The third position of the magazine or cartridges may also be a predetermined angular position, or the third position may be variable such that the launch angle can be varied within a predefined range.

In the shown example, the spoiler is a door that is hingedly suspended at a hinge 17 at the front side of the spoiler 11. The spoiler 11 is operated by a first actuator 18, which may e.g. be a motor or a solenoid. The hatch 10 is suspended to the dispenser module 2 by a first linkage 19b and a second linkage 20b. The first linkage 19b is arranged at the front of the hatch 10 and comprises in the shown example one link arm. The first linkage 19b is operated by a second actuator 21, which may also e.g. be a motor or a solenoid. It is also possible to operate the spoiler and the hatch with the same actuator, and to connect the spoiler and the hatch with a linkage such that they are operated at the same time. The second linkage 20b is arranged at the rear of the hatch 10, and comprises in the shown example also one link arm.

In comparison to the embodiment of a dispenser module 2 shown in FIG. 2a and FIG. 2b the second linkage 20b of FIGS. 6a to 6c is longer, which enables the hatch 10 to be extended further from the side wall 16 of the aircraft fuselage than if the second linkage 20a of FIGS. 2a to 2c is used, and is arranged to the inside of the side wall 16 further backwards in relation to the spoiler 11. The hatch 10 swings open by operating the actuator 21. The first linkage 19b of the embodiment of a dispenser module 2 of FIGS. 6a to 6c is also differently configured than the first linkage 19a of the embodiment of a dispenser module 2 of FIGS. 2a to 2c.

In FIG. 6b, in which the dispenser module 2 is in the second active state and the magazine 15 is pivoted to the second position, the hatch 10 is positioned with an angle β relative the pylon wall, such that the front part of the hatch 10 is more open than the rear part of the hatch 10. The angle β is preferably in the range between 5 to 20 degrees. When the magazine 15 is in the second position one reason for opening the front part of the hatch 10 more than the rear part is to let the front part of the hatch 10 be directed slightly outwards from the side wall 16, such that the launch angle of a countermeasure of a cartridge 12 is clear from the aircraft pylon structure and from any object mounted to the weapon station of the aircraft pylon structure.

In FIG. 6c the dispenser module 2 is in the third active state and the magazine 15 is pivoted to the third position. The different configuration of the first and second linkage 19b, 20b, in relation to the first and second linkage 19a, 20a of the embodiment of FIGS. 2a and 2b, enables the dispenser module 2 to assume the third active state. In FIG. 6c the hatch 10 is positioned with an angle θ relative the pylon wall, such that the rear part of the hatch 10 is opened more than the front part of the hatch 10. The angle θ is preferably in the range between 5 to 20 degrees. Thereby the openings of the cartridges 12 of the magazine 15, when the magazine 15 is in the third position, are directed slightly outwards from the side wall 16 of the aircraft pylon structure such that the launch angle of a countermeasure of a cartridge 12 is clear from the aircraft pylon structure and from any object mounted to the weapon station of the aircraft pylon structure.

For the embodiment of a dispenser module 2 according to the invention shown in FIGS. 6a to 6c the magazine 15 comprises a plurality of cartridges 12 fixedly arranged in parallel to each other. An actuator (not shown) is arranged to pivot the magazine 15 comprising the cartridges 12 from the first position to the second position, from the second position to the third position and back to the first position via the second position.

In the first position, shown in FIG. 6a, the magazine 15 is arranged in parallel to one side of the hatch 10 such that the magazine 15 is horizontal when the aircraft travels forwards in a normal orientation. The magazine 15 may also be arranged in a vertical direction in the first position. In the second position, the magazine 15 is arranged in a desired forward, and downward, launch angle as shown in FIG. 6b. In the third position, the magazine 15 is arranged in a desired backward, and downward, launch angle as shown in FIG. 6c. The magazine 15 is preferably pivoted to the third position, via the second position, after the hatch is fully opened.

Being able to launch countermeasures in a backward direction may be advantageous if hostile forces or incoming threats are located at certain angles in relation to the aircraft.

According to one embodiment the pointing direction of the cartridges 12, or of the magazine 15 comprising the cartridges 12, when being in the third position differs from the first position by at least 100 degrees. The magazine 15 comprising the cartridges 12 are pivoted to the third position when the dispenser module 2 has assumed the third active state.

Figure 7A:
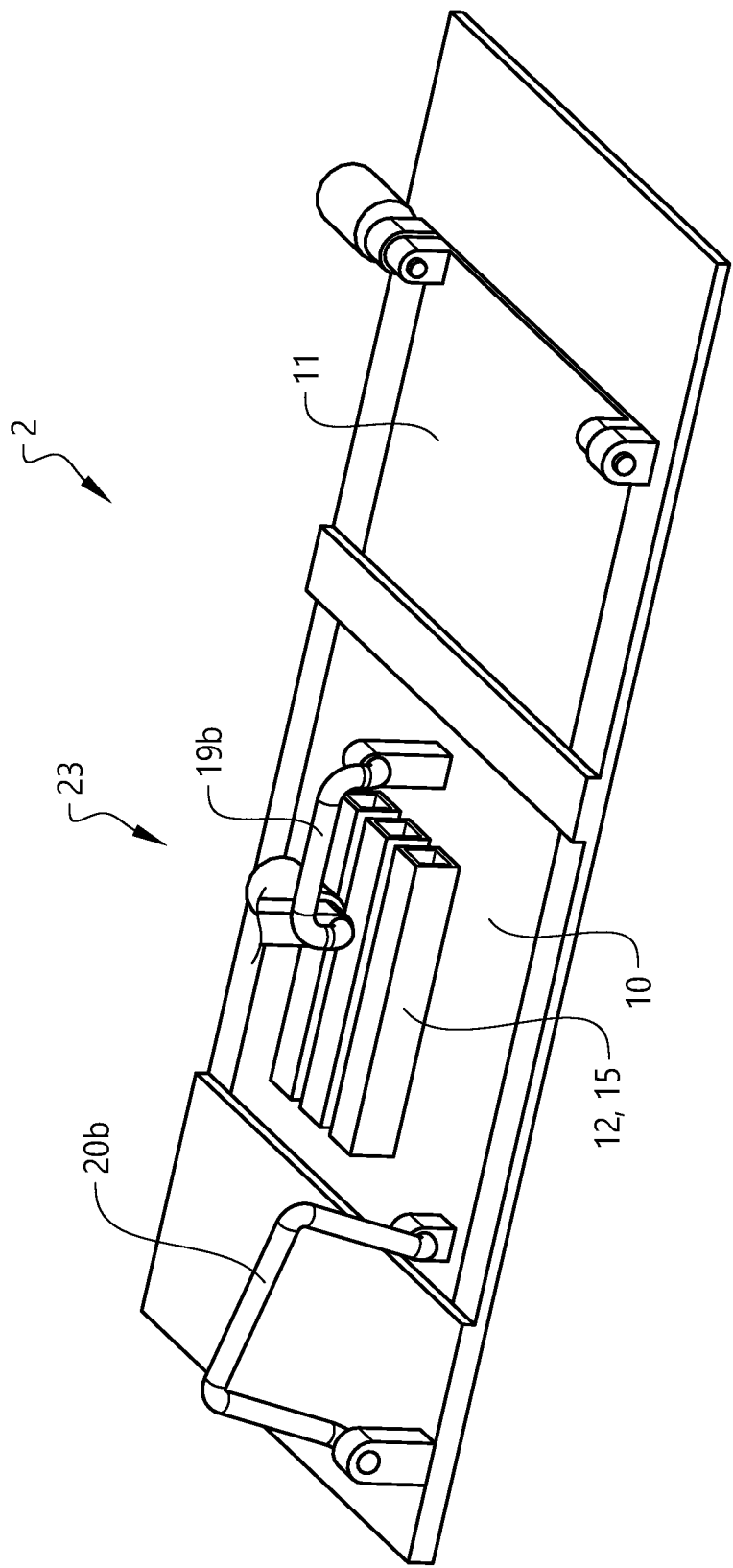
Figure 7B:
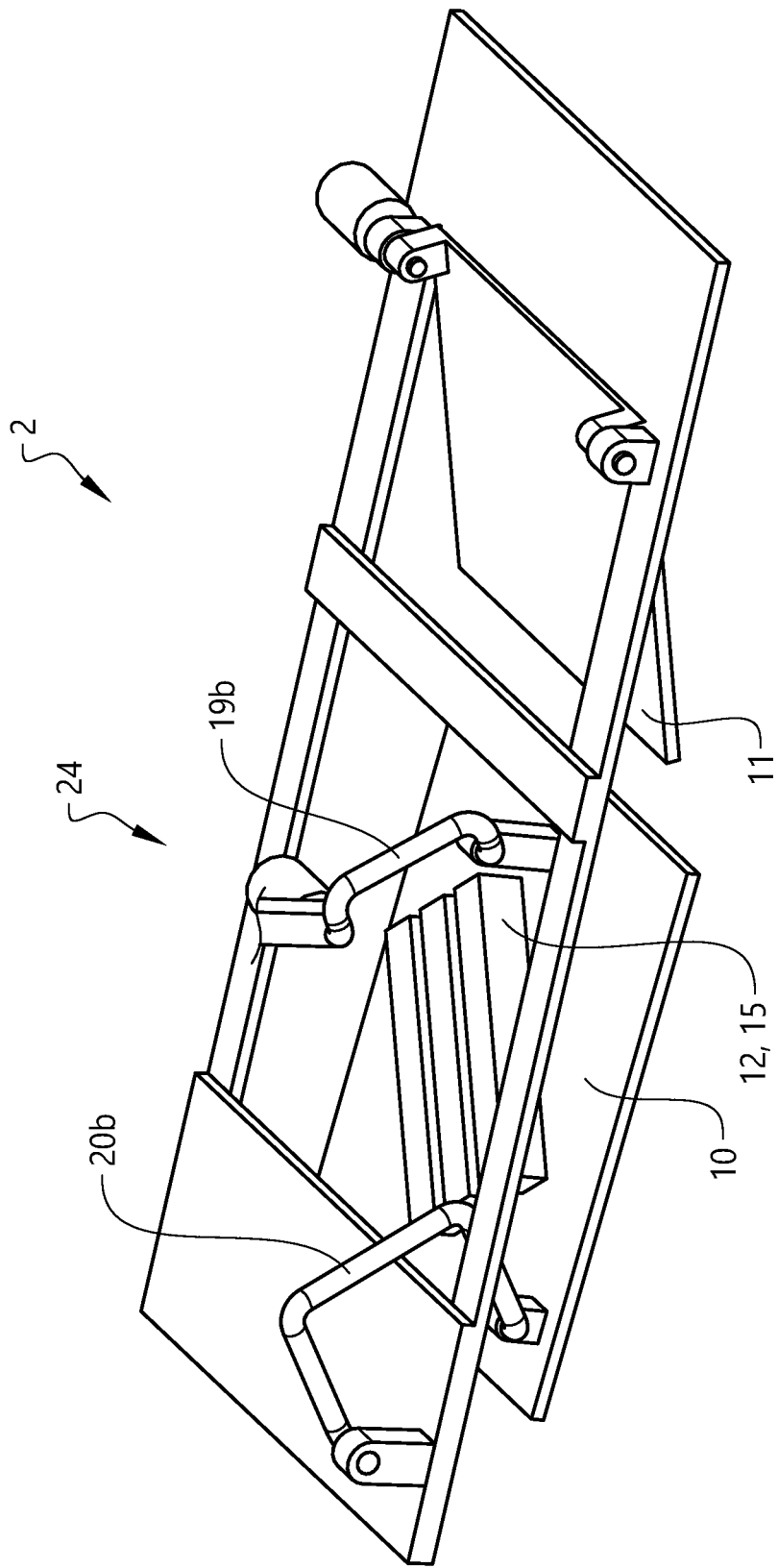

FIGS. 7a, 7b and 7c schematically shows 3D views of an embodiment of a dispenser module 2 in a first idle state 23, second active state 24 and third active state 25. For the alternative embodiment of a dispenser module 2 of FIGS. 7a to 7c the first linkage 19b and the second linkage 20b are configured differently than the first and second linkage 19a, 20a of the embodiment of FIGS. 2a and 2b. The second linkage 20b is e.g. arranged further backwards in relation to the spoiler 11 and the second linkage 20b is longer, i.e. the link arm that forms the second linkage 20b is longer. The first linkage 19b is also differently configured. Additionally, since the second linkage 20b of the embodiment of a dispenser module 2 of FIGS. 7a to 7c only comprises one link arm the second linkage 20b and the first linkage 19b is of a more robust construction, i.e. are e.g. made of thicker gods. The different configuration of the first linkage 19b and second linkage 20b enables that the dispenser module 2 may assume not only the second active state 24, as is shown in FIG. 7b, but also the third active state 25, as is shown in FIG. 7c. In the second active state 24 the magazine 15 may be pivoted to a second position enabling countermeasures to be fired in a forward, and downward direction. In the third active state 25 the magazine 15 may be further pivoted to the third position enabling countermeasures to be fired in a backward, and possibly downward, direction.

Figure 8:
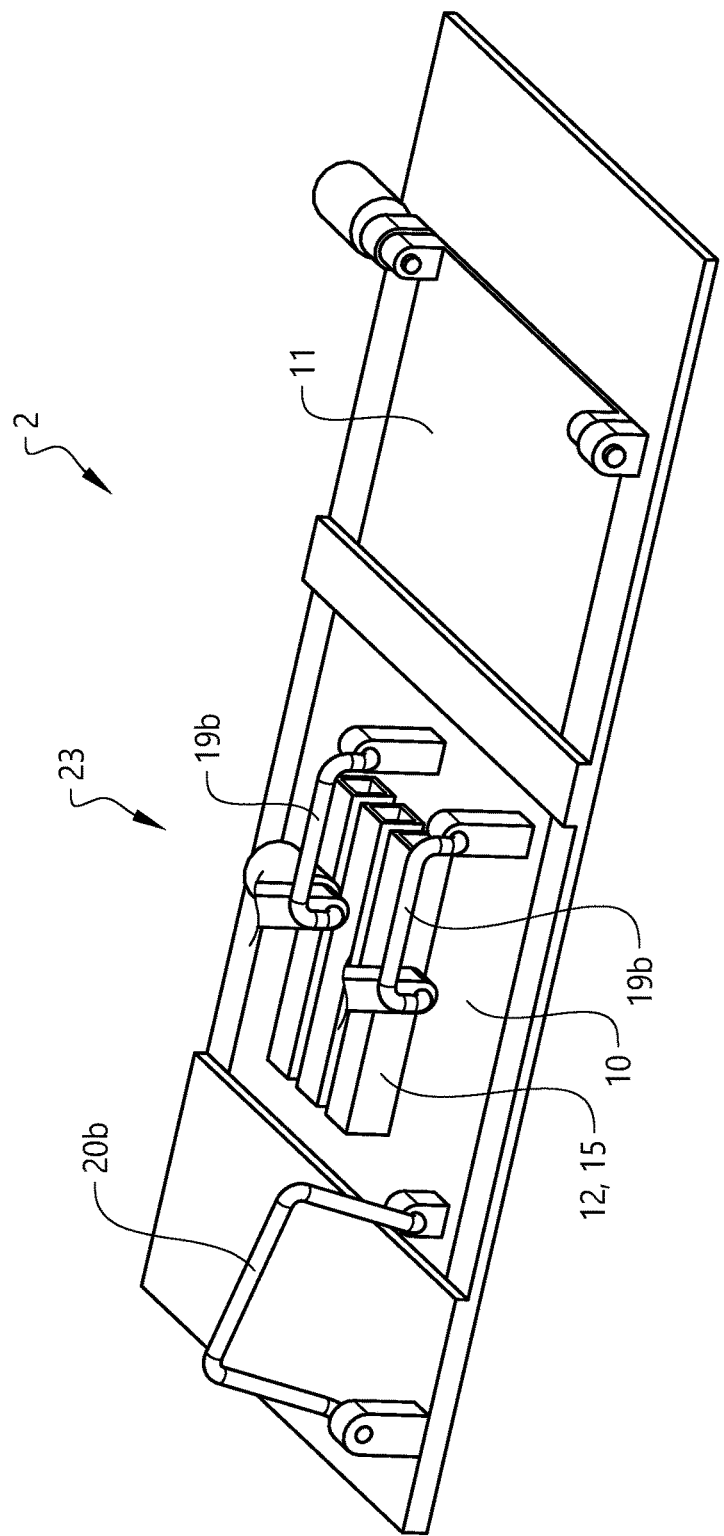

FIG. 8 schematically shows a 3D view of an alternative embodiment of a dispenser module 2 in an first idle state according to the invention. FIG. 8 discloses yet an alternative realization of the first linkage 19b and the second linkage 20b according to the invention. In FIG. 8 the first linkage 19b comprises two parallel link arms and the second linkage 20b comprises just one link arm.

The different realizations of first and second linkages 19b, 20b of FIGS. 6a to 6c, 7a to 7c and 8 are to be seen as exemplary realizations and the invention is not to be seen as limited to these exemplary realizations. Also, the features of the exemplary realizations of FIGS. 6a to 6c, 7a to 7c and 8 may be combined, and it is e.g. possible to realize the first and second linkage 19b, 20b of FIG. 8 with the more robust construction of FIGS. 7a to 7c.

The invention is not to be regarded as being limited to the embodiments described above, a number of additional variants and modifications being possible within the scope of the subsequent patent claims. The cartridges may be arranged adjacent each other in different ways and may be tilted with different means.

REFERENCE SIGNS

1: Aircraft
2: Dispenser module
3: Direction of launch
4: Trajectory
5: Countermeasure
6: Wing
7: Main body
8: Aircraft pylon structure
9: Weapon
10: Hatch
11: Spoiler
12: Cartridge
13: Cavity
14: Opening
15: Magazine
16: Side wall
17: Hinge
18: First actuator
19a, 19b: First linkage
20a, 20b: Second linkage
21: Second actuator
22: Pivot point
23: First position
24: Second position
25: Third position
26: Forward horizontal direction
27: Vertical direction

The invention claimed is:

1. A dispenser module for storing and launching countermeasures on an aircraft, comprising a magazine formed by a plurality of cartridges adapted to each hold a countermeasure, characterized in that the dispenser module is adapted to be mounted in a side wall of an aircraft fuselage or aircraft pylon structure, where the dispenser module comprises a spoiler, wherein the spoiler is positioned at a front part of the dispenser module, and a hatch, wherein the hatch is positioned at a rear part of the dispenser module, where the magazine is mounted to the hatch, where the dispenser module is adapted to assume a first idle state in which the spoiler and the hatch are retracted to be flush with the side wall before a countermeasure has been launched, where the dispenser module is adapted to assume a second active state in which the spoiler and the hatch extend outwards from the side wall when a countermeasure is to be launched, and where the dispenser module is adapted to retract to the idle state when a countermeasure has been launched.

2. Dispenser module according to claim 1, characterized in that each cartridge comprises an opening, where the dispenser module is adapted to be mounted with the cartridge openings directed in a forward direction with respect to the direction of motion of the aircraft.

3. Dispenser module according to claim 1, characterized in that the cartridges are arranged in a fixed position in which the cartridges are directed downwards with an angle that differs from the horizontal direction by at least 30 degrees.

4. Dispenser module according to claim 1, characterized in that the cartridges are arranged in a first position in which a cartridge is substantially parallel with a longitudinal side of the hatch, and that the cartridges are adapted to pivot to a second position which differs from the first position by at least 30 degrees.

5. Dispenser module according to claim 4, characterized in that the cartridges are pivoted to the second position after the dispenser module has assumed the second active state.

6. Dispenser module according to claim 4, characterized in that the dispenser module further is adapted to assume a third active state in which the spoiler and the hatch extend outwards from the side wall when a countermeasure is to be launched, and wherein the cartridges are adapted to pivot to a third position which differs from the first position by at least 100 degrees, when the dispenser module has assumed the third active state.

7. Dispenser module according to claim 6, characterized in that the rear part of the hatch will extend further from the side wall than the front part of the hatch when the dispenser module has assumed the third active state.

8. Dispenser module according to claim 1, characterized in that the hatch comprises a first linkage arranged at the front of the hatch and a second linkage arranged at the rear of the hatch.

9. Dispenser module according to claim 1, characterized in that the front part of the hatch will extend further from the side wall than the rear part of the hatch when the dispenser module has assumed the second active state.

10. Dispenser module according to claim 1, characterized in that the spoiler is adapted to be opened simultaneously with the hatch.

11. Dispenser module according to claim 1, characterized in that the spoiler is adapted to be opened after the hatch.

12. Dispenser module according to claim 1, characterized in that the spoiler is adapted to be opened before the hatch.

13. Dispenser module according to claim 1, characterized in that the spoiler is attached to the dispenser module by a hinge arranged at the front of the spoiler, where the spoiler is adapted to pivot outwards when the spoiler is opened.

14. Dispenser module according to claim 1, characterized in that the spoiler is adapted to extend from the dispenser module in a perpendicular direction.

15. An aircraft, characterized by that it comprises at least one dispenser module according to claim 1.

16. A method for launching a countermeasure from a dispenser module mounted on an aircraft, where the countermeasure is arranged in a cartridge, where the dispenser module comprises a plurality of cartridges and where the dispenser module comprises a spoiler and a hatch 404, wherein the method comprises the steps of:
    extending the spoiler and the hatch from a side wall of an aircraft pylon structure to an active state,
    launching the countermeasure,
    retracting the spoiler and the hatch to an idle state.

17. A method according to claim 16, characterized in that the cartridges are pivoted from a first position to a second position after the dispenser module has assumed the active state.

18. A method according to claim 16, characterized in that the cartridges are pivoted from a first position to a third position after the dispenser module has assumed the third active state.

* * * * *